(12) United States Patent
Poland et al.

(10) Patent No.: US 6,705,995 B1
(45) Date of Patent: *Mar. 16, 2004

(54) METHOD AND APPARATUS FOR 1D ARRAY ULTRASOUND PROBE

(75) Inventors: McKee Dunn Poland, Andover, MA (US); Bernard J. Savord, Andover, MA (US); Michael P. Anthony, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/264,900

(22) Filed: Oct. 4, 2002

(51) Int. Cl.[7] .................................................. A61B 8/00
(52) U.S. Cl. ...................................................... 600/447
(58) Field of Search ................................. 600/437, 443, 600/447; 73/625–626; 367/7, 11, 103–105

(56) References Cited

U.S. PATENT DOCUMENTS

| | | | | |
|---|---|---|---|---|
| 4,139,787 A | * | 2/1979 | Amelio | 307/264 |
| 4,159,462 A | * | 6/1979 | Rocha et al. | 73/626 |
| 4,267,584 A | * | 5/1981 | McKeighen et al. | 367/11 |
| 4,336,607 A | * | 6/1982 | Hill et al. | 367/123 |
| 4,387,597 A | * | 6/1983 | Brandestini | 73/626 |
| 5,229,933 A | | 7/1993 | Larson, III | |
| 5,261,281 A | * | 11/1993 | Katakura et al. | 73/626 |
| 5,271,276 A | * | 12/1993 | Katakura et al. | 73/626 |
| 5,301,168 A | * | 4/1994 | Miller | 367/138 |
| 5,307,815 A | | 5/1994 | Gatzke et al. | |
| 5,522,391 A | | 6/1996 | Beaudin et al. | |
| 5,590,658 A | | 1/1997 | Chiang et al. | |
| 5,678,552 A | | 10/1997 | Savord | |
| 5,690,114 A | * | 11/1997 | Chiang et al. | 600/447 |
| 5,800,354 A | | 9/1998 | Hofland et al. | |
| 5,993,390 A | | 11/1999 | Savord et al. | |
| 5,997,479 A | | 12/1999 | Savord et al. | |
| 6,013,032 A | | 1/2000 | Savord | |
| 6,102,863 A | * | 8/2000 | Pflugrath et al. | 600/447 |
| 6,126,602 A | | 10/2000 | Savord et al. | |
| 6,241,676 B1 | | 6/2001 | Savord | |
| 6,292,435 B1 | | 9/2001 | Savord et al. | |
| 6,314,057 B1 | | 11/2001 | Solomon et al. | |
| 6,370,264 B1 | | 4/2002 | Leavitt | |
| 6,380,766 B2 | | 4/2002 | Savord | |
| 6,381,197 B1 | | 4/2002 | Savord et al. | |
| 6,500,120 B1 | * | 12/2002 | Anthony | 600/437 |

* cited by examiner

*Primary Examiner*—Francis J. Jaworski
(74) *Attorney, Agent, or Firm*—John Vodopia

(57) ABSTRACT

A phased array ultrasound scanning apparatus includes a one-dimensional (1-D) array of ultrasound transducer elements having transmit and receive elements. The 1-D array is responsive to a transmitter configured to energize the transmit elements for generating a transmit acoustic beam directed into a region of interest. A receive beamformer, operatively connected to the 1-D array, synthesizes receive beams, in response to echoes of the transmit acoustic beam received from the region of interest. The receive beamformer includes analog random access memory (ARAM) delay elements configured to delay signals received from the receive elements and provide the delayed signals on an output of the receive beamformer as a beamformed RF output. The beamformed RF output is suitable for use in forming an image of the region of interest.

25 Claims, 4 Drawing Sheets

METHOD AND APPARATUS FOR 1D ARRAY ULTRASOUND PROBE

BACKGROUND

The present disclosure relates to ultrasound imaging devices, and more particularly, to a method and apparatus for a 1-D array ultrasound probe.

Phased array ultrasonic imaging systems have been used to produce real-time images of internal portions of the human body. Such imaging systems include a multiple channel transmit beamformer and a multiple channel receive beamformer either coupled to a single array of ultrasonic transducers using a transmit/receive switch, or coupled separately to a transmit transducer array and a receive transducer array. The transmit beamformer generates timed electrical pulses and applies them to the individual transducer elements in a predetermined timing sequence. The transducers respond to the electrical pulses and emit corresponding pressure waves, which are phased to form a transmit beam that propagates in a predetermined direction from the transducer array.

As the transmit beam passes through the body, a portion of the acoustic energy is scattered back toward the transducer array from tissue structures having different acoustic characteristics. An array of receive transducers (which may be the same as the transmit array) converts the pressure pulses into the corresponding electrical pulses. Due to different distances, the ultrasonic energy scattered from a tissue structure, arrives back at the individual transducers at different times. Each transducer produces an electrical signal that is amplified and provided to one processing channel of the receive beamformer. The receive beamformer has a plurality of processing channels with compensating delay elements connected to a summing element. The system selects a delay value for each channel to collect echoes scattered from a selected point.

Consequently, when the delayed signals are summed, a strong signal is produced from signals corresponding to the selected point, but signals arriving from other points, corresponding to different times, have different phase relationships and thus destructively interfere. The relative delays of the compensating delay elements control the orientation of the receive beam with respect to the transducer array. By varying the delays during reception of echoes from a given transmit event, the receive beamformer can steer the receive beam to have a desired direction and can dynamically focus over a range of depths.

To collect imaging data, the transmit beamformer directs the transducer array to emit ultrasound beams along multiple transmit scan lines distributed over a desired scan pattern. For each transmit beam, the receive transducer array connected to the receive beamformer synthesizes one or several receive beams having selected orientations. The transmit and receive beams form a round-trip beam (i.e., "center of mass" beam) that is generated over a predetermined angular spacing to create a wedge-shaped acoustic image or is generated over a predetermined linear spacing to create a parallelogram-shaped acoustic image. Arbitrary combinations of the aforementioned patterns can be used to create more complex scanned image shapes, with arbitrary density of acoustic sampling.

A one-dimensional array may have up to several hundred elements. These elements are typically connected to a system with 128 channels of processing electronics. The receive beamformer within these channels uses digital signal processing involving an A/D converter and digital circuitry. This circuitry takes a substantial amount of size and power such that a hand held system cannot be built using this method.

Generally, ultrasound imaging devices are large, expensive ultrasound devices that connect to probes which do not contain integrated high voltage pursers, nor transmit/receive beamforming, and are not very portable.

Accordingly, it would be desirable to provide an ultrasound imaging system architecture that uses a large transducer array for providing two-dimensional images and that is practical in size, cost and complexity.

SUMMARY

A phased array ultrasound scanning apparatus includes a one-dimensional (1-D) array of ultrasound transducer elements having transmit and receive elements. The 1-D array is responsive to a transmitter configured to energize the transmit elements for generating a transmit acoustic beam directed into a region of interest. A receive beamformer, operatively connected to the 1-D array, synthesizes receive beams, in response to echoes of the transmit acoustic beam received from the region of interest. The receive beamformer includes analog random access memory (ARAM) delay elements configured to delay signals received from the receive elements and provide the delayed signals on an output of the receive beamformer as a beamformed RF output. The beamformed RF output is suitable for use in forming an image of the region of interest.

DETAILED DESCRIPTION

Figure 1:
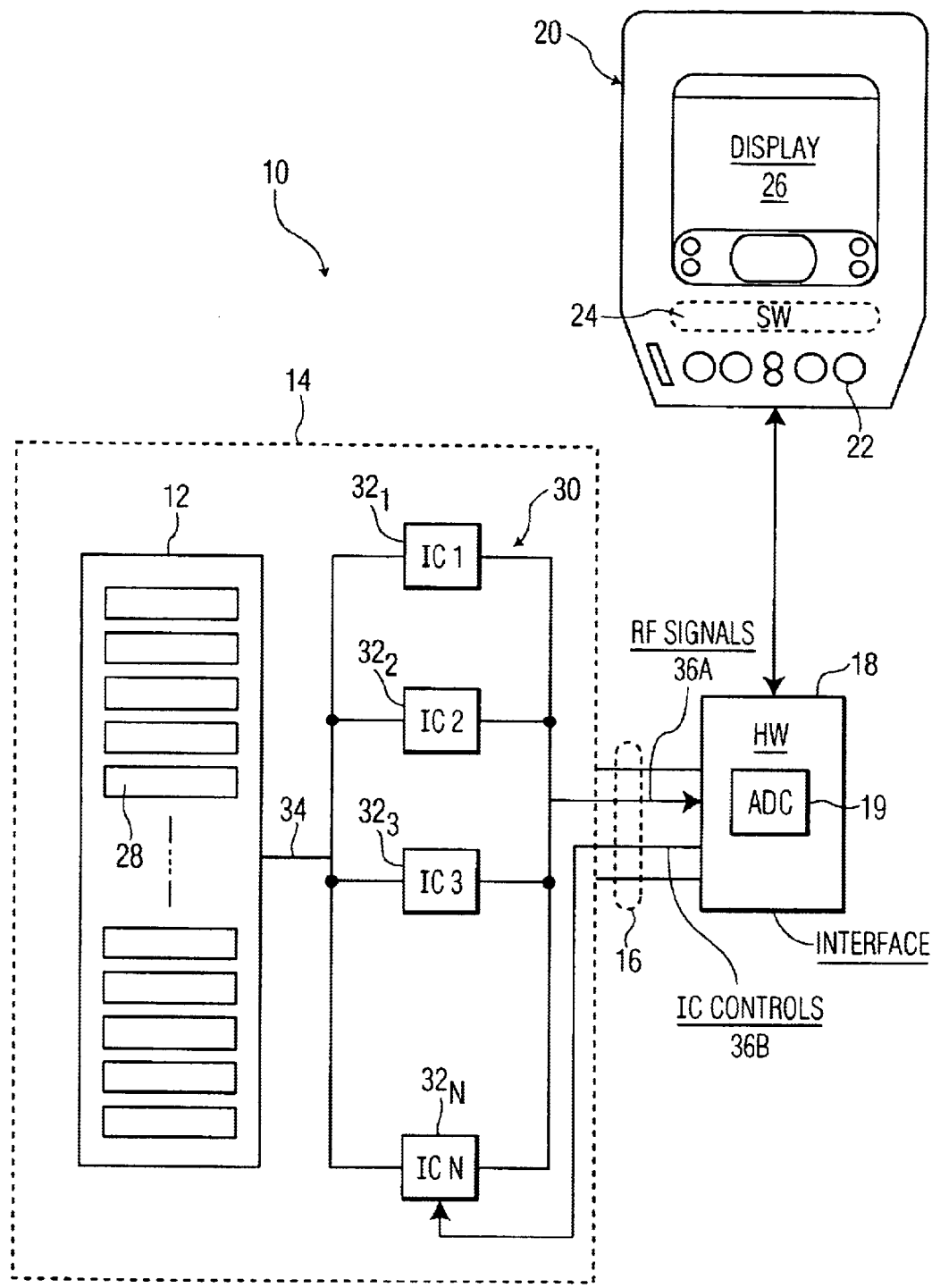
FIG. 1 is a diagrammatic view of a phased array ultrasound imaging system according to one embodiment of the present disclosure.

Referring to FIG. 1, a phased array ultrasonic imaging system 10 includes an array of transducer elements 12 located in a transducer handle 14. Transducer handle 14 operatively couples via a transducer cable 16 and a transducer interface 18 to an electronics unit 20. Interface 18 may include, for example, an analog to digital converter 19 (ADC) for converting analog signal to respective digital signals, as well as other circuitry. Electronics unit 20 includes a control panel 22, operating and application software 24, and provides imaging signals to display 26. Software 24 includes components for image detection and scan conversion. Image detection preferably includes the steps or RF filtering, mixing, analytic echo envelope detection, logging, and further smoothing. Scan conversion converts the echo data from the format of the scanned acoustic lines to the preferably Cartesian format of display 26.

Transducer array 12 can include several hundred transducer elements 28 arranged as a large one-dimensional array, phased array (PA), linear array (LA) or curved linear array (CLA) according to the requirements for a particular ultrasound imaging system. In addition, transducer array 12 may have the transducer elements arranged into separate transmit and receive arrays distributed along the one-dimensional array. Alternatively, the transducer transmit and receive elements may be distributed over a semi-random pattern along the one-dimensional array.

Transducer handle 14 includes transmit pulse generators and the associated high voltage drivers, low noise receive pre-amplifiers, and delay and summing circuits, generally indicated by reference numeral 30. Importantly, in one embodiment, the elements are integrated within a small volume and placed inside transducer handle 14.

Transducer cable 16 includes at least one signal wire, power supply wires, clock lines, and digital communication. For example, transducer cable 16 includes constituent parts 36A and 36B, for carrying corresponding RF signals and IC controls, respectively, as shown in FIG. 1.

Alternatively, transducer array 12 employs the same transducer elements to emit a transmit beam and detect a receive beam. In this arrangement, imaging system 10 includes a transmit/receive switch (T/R switch not shown in FIG. 1) to switch between a transmit beamformer and a receive beamformer depending on the operating mode. During transmission of ultrasound energy, the switch connects the elements to the transmit beamformer and protect the receive beamformer. After emitting the transmit beam, the T/R switch connects the transducer elements to the receive beamformer.

In one embodiment, ultrasound imaging system 10 utilizes a one-dimensional transducer array 12 having, for example, 128 transducer elements to acquire two-dimensional image data of a human organ or region of interest. Imaging system 10 uses approximately one half of the transducer elements to transmit ultrasound energy and the other half to receive ultrasound energy. The transmit and receive elements are randomly distributed over array 12. By separating the transmit and receive elements, the system can be fabricated without the T/R switches, thus reducing a complexity of the system.

Each integrated circuit 32 may include a set of digital pulse generators that generate transmit pulses and high voltage driver circuits that amplify the transmit pulse to on the order of approximately one hundred volts (~100 v) used to excite the transducer element to emit ultrasound. Each integrated circuit may also include low noise receive preamplifiers, analog delay circuitry to perform the receive beamforming, and digital control circuitry, further as discussed below. The low noise receive preamplifiers preamplify the transducer signal and provide the preamplified signal to the delay circuitry. The delay circuitry performs receive beamforming by applying selected delay values to the signals.

Figure 2:
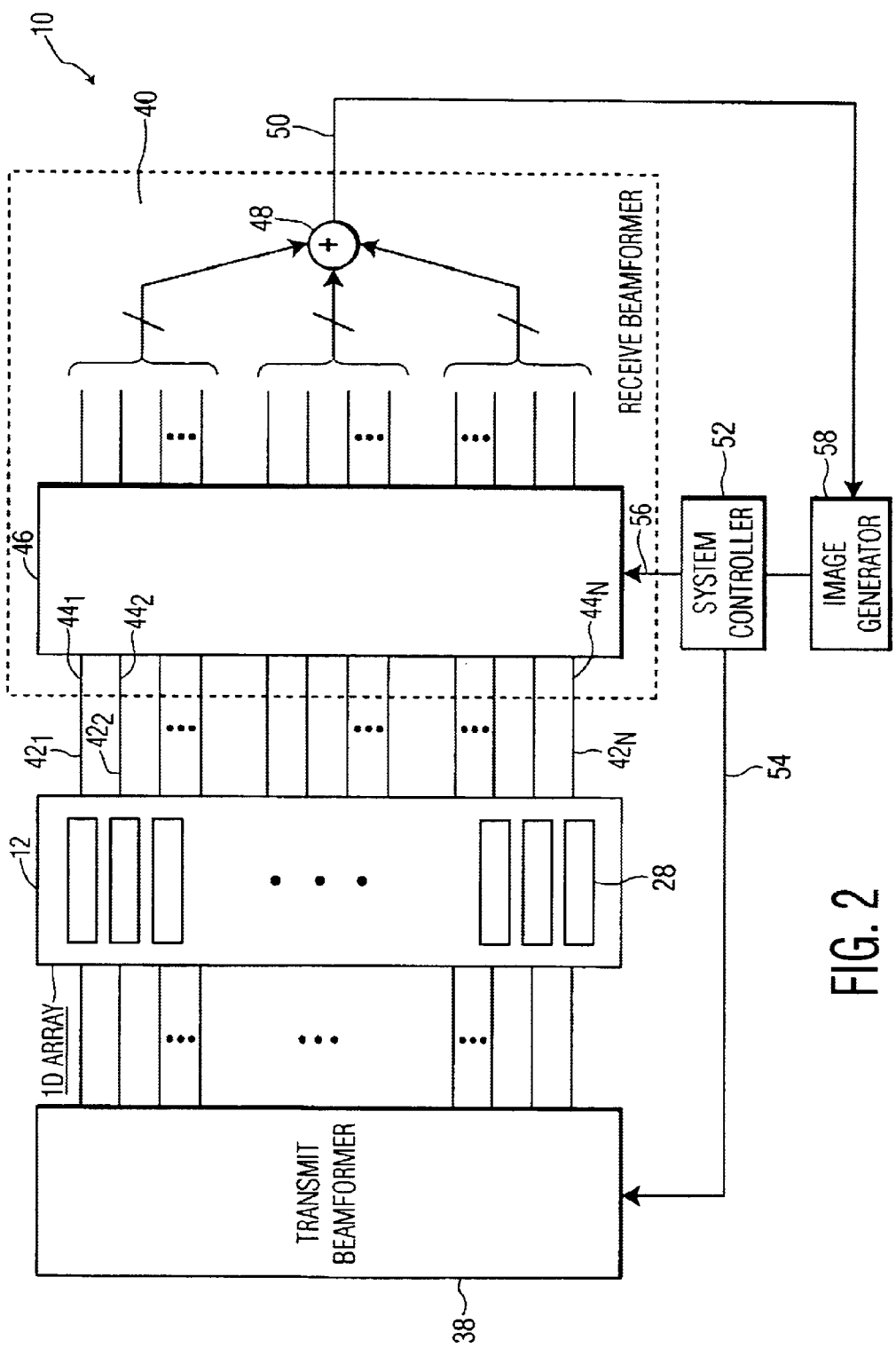
FIG. 2 is a diagrammatic view of the imaging system including a 1-D array of ultrasound transducers operatively coupled to a transmit beamformer and a receive beamformer according to one embodiment of the present disclosure.

FIG. 2 is a block diagram of imaging system 10 having transducer array 12 operatively coupled to a transmit beamformer 38 and operatively coupled to receive beamformer 40.

Figure 3:
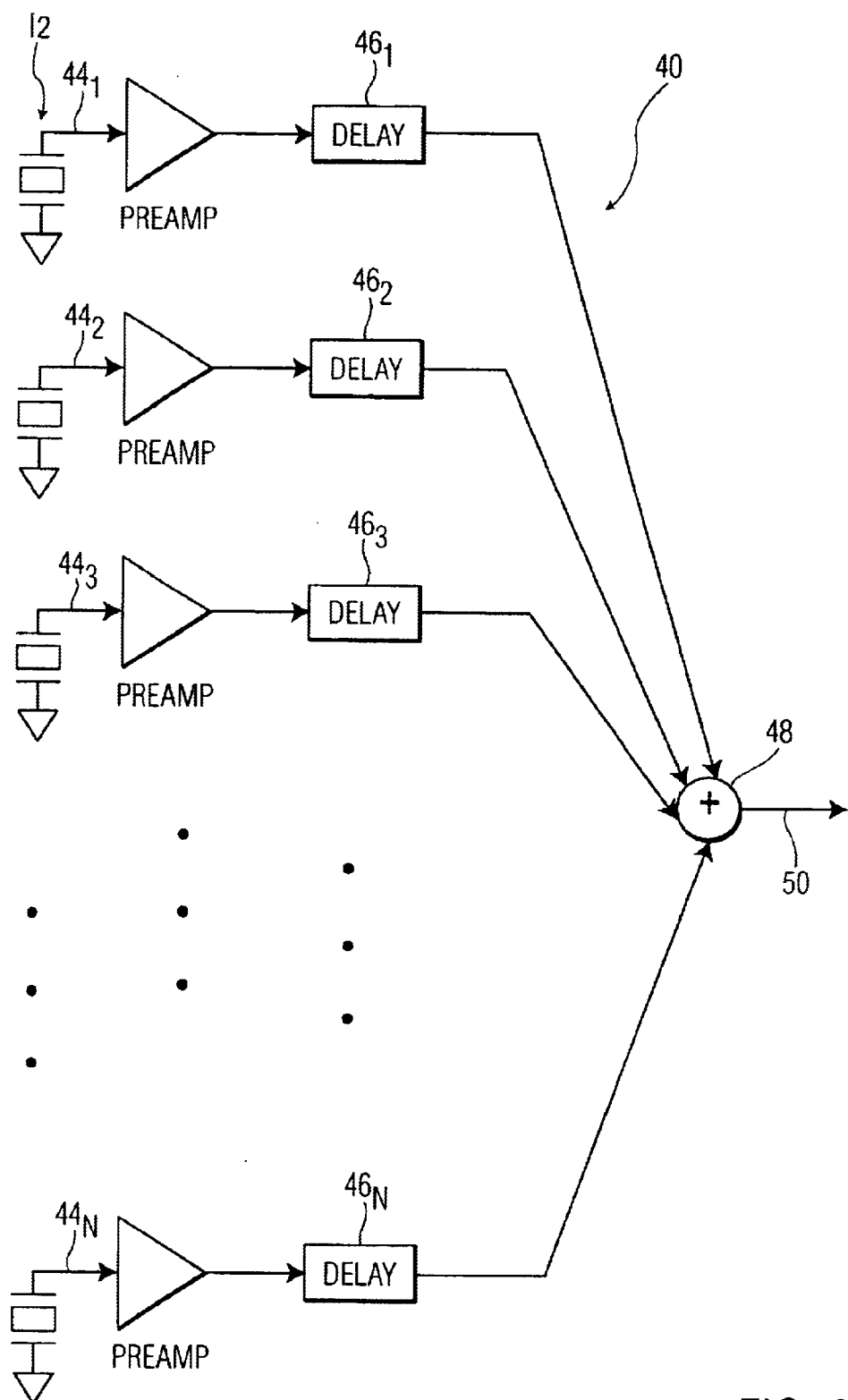
FIG. 3 is a block diagram view of several illustrative transducer elements operatively coupled to programmable delay lines connected to a summing junction of the receive beamformer.

As described in connection with FIG. 3, the channels $44_i$ of receive beamformer 40 include programmable delay elements 46 connected to a summing element 48 (a summing junction). The programmable delay element $44_i$ of each respective channel of the receive beamformer 40 delays the corresponding individual transducer signals and connects to summing junction 48. The summing junction adds the delayed signals and provides the summed signal to the channel output 50 of receive beamformer 40.

Referring again to FIG. 2, a system controller 52 includes a microprocessor and an associated memory. Controller 52 is configured to control the operation of imaging system 10. System controller 52 provides delay commands to the transmit beamformer channels via a bus 54. The delay data steers and focuses the generated transmit beams over transmit scan lines of a wedge-shaped transmit pattern, a parallelogram-shaped transmit pattern, or other patterns.

The system controller 52 also provides delay commands to the channels of the receive beamformer via a bus 56. The applied relative delays control the steering and focusing of the synthesized receive beams. Each receive beamformer channel $44_i$ includes a variable gain amplifier, which controls gain as a function of received signal depth, and a delay element that delays acoustic data to achieve beam steering and dynamic focusing of the synthesized beam. Summing element 48 receives the outputs from beamformer channels and adds the outputs to provide the resulting beamformer signal 50 to an image generator 58.

The beamformer signal represents a receive ultrasound beam synthesized along a receive scan line. Image generator 58 constructs an image of a region probed by a multiplicity of round-trip beams synthesized over a sector-shaped pattern, a parallelogram-shaped pattern or other patterns.

The transmit beamformer may include an analog or digital beamformer as described, for example, in U.S. Pat. Nos. 4,140,022; 5,469,851; or U.S. Pat. No. 5,345,426 all of which are incorporated by reference.

Alternatively, the transmit beamformer may use the same analog delay element as the receive beamformer. In this arrangement switches are used to switch the analog delay circuits to delay transmit signals during transmit and to delay receive signals during signal reception. The analog delay circuitry can be used to delay either analog signals or digital pulses.

Referring again to FIG. 3, receive beamformer 40 comprises an analog receive beamformer including a set of programmable delay lines $46_1$, $46_2$, $46_3$, and $46_N$ connected to a summing element 48. The output 50 of summing element 48 provides the delayed and summed signals of receive beamformer 40. Programmable delay lines $46_i$ are implemented as analog delay lines. Each analog delay line $46_i$ includes an analog RAM as is described in connection with FIG. 4.

As discussed herein, the ultrasound system includes an array of transducer elements. The transducer elements are operatively coupled to receive beamformer channels, the beamformer channels including analog delay lines, the delay being configurable.

Figure 4:
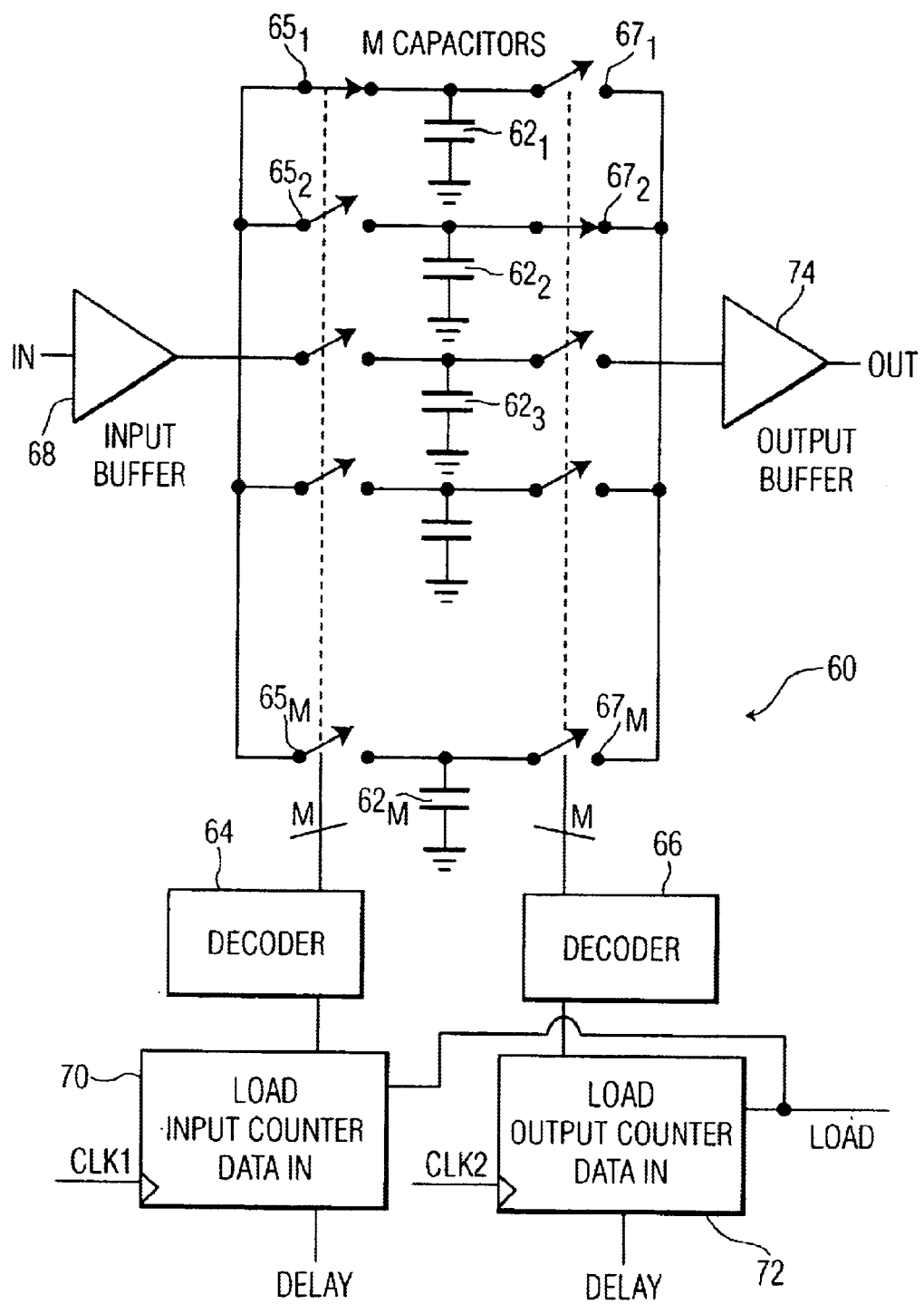
FIG. 4 is a diagrammatic view of an analog random access memory element used as a programmable delay element in the receive beamformer of the ultrasound imaging system of the present disclosure.

Referring now to FIG. 4, analog random access memory (RAM) device 60 is configured as a programmable delay element. RAM device 60 includes a group of M storage capacitors $62_1$, $62_2$, $62_3$, ..., $62_M$ for storing M input sample signals using decoders 64 and 68 connected to input switches $65_1$, $65_2$, ..., $65_M$ and output switches $67_1$, $67_2$, ..., $67_M$, respectively. An input buffer 68 receives a transducer signal that is then sent by input switch $65_i$ controlled by decoder 64 to storage capacitor $62_i$. Decoder 66 coupled to output switch $67_i$ samples the individual capacitor charges at delay times determined by the difference in timing between an input counter 70 and an output counter 72. Accordingly, the transducer signals are delayed by selected delay times as they are transferred from input buffer 68 to an output buffer 74.

In one embodiment, the time difference between the two counters 70 and 72 is held at a constant value for all pixels along an acoustic line by making the clocks (CLK1 and CLK2) to the two counters identical. This embodiment provides a fixed static focus.

In another embodiment, the time difference between the two counters 70 and 72 is varied along an acoustic line by using different clocks for the two counters. By choosing appropriate pulse streams for the two clocks, focus can be maintained for all pixels along the acoustic line. This embodiment provides dynamic focusing.

Referring again to FIG. 2, the imaging system 10 includes system controller 52 with a digital control circuit configured to provide delay values to the transmit and receive beamformers, as shown diagrammatically by data buses 54 and 56. Both transmit and receive beamformers are configured to receive delay values by these data buses.

As disclosed herein, a phased array ultrasound scanning apparatus includes a one-dimensional (1-D) array of ultrasound transducer elements including transmit and receive elements. The 1-D array is responsive to a transmitter configured to energize the transmit elements for generating a transmit acoustic beam directed into a region of interest. The apparatus further includes a receive beamformer operatively connected to the 1-D array. The receive beamformer is configured to synthesize receive beams, in response to echoes of the transmit acoustic beam received from the region of interest. In addition, the receive beamformer includes analog random access memory (aRAM) elements configured to delay signals received from the receive elements and provide the delayed signals on an output of the receive beamformer as a beamformed RF output. The receive beamformer further includes a summer configured to sum the delayed signals and to generate the beamformed RF output in response to the sum of the delayed signals. The beamformed RF output is suitable for use in forming an image of the region of interest.

In one embodiment, the receive beamformer is configured to implement static beamforming. With static beamforming, the beamformed RF output is suitable for use in forming the image by splicing to produce consistent resolution through a greater depth of field. Splicing employs multiple transmit events per scan line in a given direction, each transmit event focused at successively shallower depths. The received acoustic data sets from the successive events are collected by the system processor, and adjacent sections from the successive data sets are excerpted so that their data is near the corresponding transmit event's focus. The excerpted data sets are combined into one composite receive line with superior depth of regard than any of the supplier receive lines. The splicing process is repeated for every scan line of the overall image scan.

In another embodiment, the receive beamformer is configured to implement dynamic beamforming, including dynamically updating delay values with time so as to maintain focus for all pixels along an acoustic line.

The phased array ultrasound scanning apparatus further includes suitable detector, including hardware and software, for detecting the image of the region of interest in response to the beamformed RF output. In addition, the apparatus includes a display unit, operatively connected to the detector, for displaying the detected image. A user interface is operatively connected to the image detector and display unit, the user interface configured to control a control parameter of at least one of the image detector and the display unit. In one embodiment, the image detector, display, and user interface comprise one or more of a portable personal computer (PC), a Personal Digital Assistant (PDA), and a pocket PC.

In one embodiment, the transducer array, receive beamformer, image detector, and display comprise a single package. In another embodiment, the transducer array and receive beamformer comprise a first package, and the image detector and display comprise a second package, wherein the first package is operatively coupled to the second package.

According to yet another embodiment, the transducer array is in one package, and the receive beamformer, image detector and display are in a second package.

In one embodiment of the invention, statically focused RF is used to form an image of an area of interest. It is recognized that this embodiment has a problem associated with the limited depth of field resulting from static focus beamforming. However, the reduced complexity and lower cost may make this problem acceptable.

With static focus, depth of field can be increased by splicing receive data from multiple acoustic lines with different transmit foci.

As indicated above, the receive beamformer can be modified to adjust the receive delays during reception, allowing a continuously focused summation of channel data into the single RF signal. Accordingly, the beamformer can be configured for dynamic focus.

With the embodiment discussed above, no beamforming is needed external to the probe. Simple image detection can be done on an interface board that plugs directly into a portable PC, such as a notebook, palmtop, or a personal digital assistant (PDA). The circuitry required for the ultrasound data acquisition and beamforming is provided within the probe itself. An interface couples the probe to the PC. Image detection, formatting, and display are performed by suitable hardware and software in the PC, using beamformed RF data from the probe. The beamformed RF data is transferred on a single analog or digital channel from the probe to the interface. The interface can include a standard interface such as Compact Flash (CF or CF+), PCMCIA, USB, FireWire, FibreChannel, PCI, UART, or other suitable interface Although only a few exemplary embodiments have been described in detail above, those skilled in the art will readily appreciate that many modifications are possible in the exemplary embodiments without materially departing from the novel teachings and advantages of the embodiments of the present disclosure. For example, one can split the beamformer into one or more stages with the first stage beamforming sub-arrays of elements and the second stage beamforming the outputs of the sub-array beamformers. In another example, one could use sample and hold devices or switched capacitor devices or charge coupled devices instead of the ARAM for the analog delay elements. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A phased array ultrasound scanning apparatus comprising:
   a one-dimensional (1-D) array of ultrasound transducer elements including transmit and receive elements, said 1-D array responsive to a transmitter configured to energize the transmit elements for generating a transmit acoustic beam directed into a region of interest; and
   a receive beamformer operatively connected to said 1-D array, said receive beamformer configured to synthesize receive beams, in response to echoes of the transmit acoustic beam received from the region of interest, said receive beamformer including analog random access memory (aRAM) elements configured to delay signals received from the receive elements and provide the delayed signals on an output of said receive beamformer as a beamformed RF output, the beamformed RF output suitable for use in forming an image of the region of interest, wherein the aRAM includes first and second counters responsive to first and second clocks, respectively, for providing one of fixed static focusing and dynamic focusing in response to a time difference between first and second clocks being held i) a constant value for all pixels along an acoustic line and ii) a varied value for all pixels along the acoustic line.

2. The apparatus of claim 1, wherein said 1-D array includes one selected from the group consisting of a phased array, a linear phased array, and a curved linear phased array.

3. The apparatus of claim 1, wherein said receive beamformer is configured to implement static focusing.

4. The apparatus of claim 3, wherein the beamformed RF output is suitable for use in forming the image by splicing to produce consistent resolution through a greater depth of field.

5. The apparatus of claim 1, wherein said receive beamformer is configured to implement dynamic focusing.

6. The apparatus of claim 1, further comprising:
means for detecting the image of the region of interest in response to the beamformed RF output; and
means, operatively connected to said detecting means, for displaying the detected image.

7. The apparatus of claim 6, wherein said transducer array, said receive beamformer, said image detection means, and said display means comprise a single package.

8. The apparatus of claim 6, wherein said transducer array and said receive beamformer comprise a first package, and said image detection means and said display means comprise a second package, wherein the first package is operatively coupled to the second package.

9. The apparatus of claim 6, wherein said transducer array comprises a first package, and said receive beamformer, said image detection means and said display means comprise a second package, wherein the first package is operatively coupled to the second package.

10. The apparatus of claim 6, further comprising:
a user interface operatively connected to said image detection means and said display means, said user interface configured to control a control parameter of at least one of said image detection means and said display means.

11. The apparatus of claim 10, wherein said image detection means, said display means, and said user interface comprise one selected from the group consisting of a portable personal computer (PC), a Personal Digital Assistant (PDA), and a pocket PC.

12. The apparatus of claim 10, wherein one or more of said control parameters and acoustic data signals is transferred to said detecting means and to said display means by an interface selected from the group consisting of Compact Flash (CF and CF+), PCMCIA, USB, FireWire, FibreChannel, PCI, and UART.

13. A phased array ultrasound scanning apparatus comprising:
a one-dimensional (1-D) array of ultrasound transducer elements including transmit and receive elements, said 1-D array responsive to a transmitter, configured to energize the transmit elements for generating a transmit acoustic beam directed into a region of interest;
a receive beamformer operatively connected to said 1-D array, said receive beamformer configured to synthesize receive beams, in response to echoes of the transmit acoustic beam received from the region of interest, said receive beamformer including analog random access memory (aRAM) elements configured to delay signals received from the receive elements and provide the delayed signals on an output of said receive beamformer as a beamformed RF output, the beamformed RF output suitable for use in forming an image of the region of interest;
means for detecting the image of the region of interest in response to the beamformed RF output; and
means, operatively connected to said detecting means, for displaying the detected image, wherein said transducer array, said receive beamformer, said image detection means, and said display means together comprise a configuration of at least one selected from the group consisting of individual physical units operatively coupled together and combinations of physical units operatively coupled together.

14. A method for phased array ultrasound scanning comprising:
providing a one-dimensional (1-D) array of ultrasound transducer elements including transmit and receive elements, the 1-D array responsive to a transmitter configured to energize the transmit elements for generating a transmit acoustic beam directed into a region of interest; and
configuring a receive beamformer to operatively connect to the 1-D array and to synthesize receive beams in response to echoes of the transmit acoustic beam received from the region of interest, the receive beamformer including analog random access memory (aRAM) elements configured to delay signals received from the receive elements and provide the delayed signals on an output of the receive beamformer as a beamformed RF output, the beamformed RF output suitable for use in forming an image of the region of interest, wherein the aRAM includes first and second counters responsive to first and second clocks, respectively, for providing one of fixed static focusing and dynamic focusing in response to a time difference between first and second clocks being held i) a constant value for all pixels along an acoustic line and ii) a varied value for all pixels along the acoustic line.

15. The method of claim 14, wherein the 1-D array includes one selected from the group consisting of a phased array, a linear phased array, and a curved linear phased array.

16. The method of claim 14, further comprising configuring the receive beamformer to implement static focusing.

17. The method of claim 16, wherein the beamformed RF output is suitable for use in forming the image by splicing to produce consistent resolution through a greater depth of field.

18. The method of claim 14, further comprising configuring the receive beamformer to implement dynamic focusing.

19. The method of claim 14, further comprising:
detecting, via an image detector, the image of the region of interest in response to the beamformed RF output; and
displaying, via a display, the detected image.

20. The method of claim 19, further comprising:
combining the transducer array, the receive beamformer, an image detector, and a display into a single package.

21. The method of claim 19, further comprising: combining the transducer array, receive beamformer, detector, and display into at least one of multiple combinations of packages.

22. The method of claim 19, further comprising: configuring a user interface to control a control parameter of at least one of the image detector and the display.

23. The method of claim 22, wherein the image detector, display, and user interface comprise one selected from the group consisting of a portable personal computer (PC), a Personal Digital Assistant (PDA), and a pocket PC.

24. The method of claim 22, wherein one or more of the control parameter and acoustic data signals is transferred to the image detector and the display by an interface selected from the group consisting of Compact Flash (CF and CF+), PCMCIA, USB, FireWire, FibreChannel, PCI, and UART.

25. A method of phased array ultrasound scanning comprising:

providing a one-dimensional (1-D) array of ultrasound transducer elements including transmit and receive elements, the 1-D array responsive to a transmitter configured to energize the transmit elements for generating a transmit acoustic beam directed into a region of interest;

configuring a receive beamformer to operatively connect to the 1-D array and to synthesize receive beams in response to echoes of the transmit acoustic beam received from the region of interest, the receive beamformer including analog random access memory (aRAM) elements configured to delay signals received from the receive elements and provide the delayed signals on an output of the receive beamformer as a beamformed RF output, the beamformed RF output suitable for use in forming an image of the region of interest, wherein the aRAM includes first and second counters responsive to first and second clocks, respectively, for providing one of fixed static focusing and dynamic focusing in response to a time difference between first and second clocks being held i) a constant value for all pixels along an acoustic line and ii) a varied value for all pixels along the acoustic line;

detecting, via an image detector, the image of the region of interest in response to the beamformed RF output; and displaying, via a display, the detected image, wherein the transducer array, receive beamformer, image detector, and display together comprise a configuration of at least one of multiple combinations of packages operatively coupled together.

* * * * *